Figure 1:
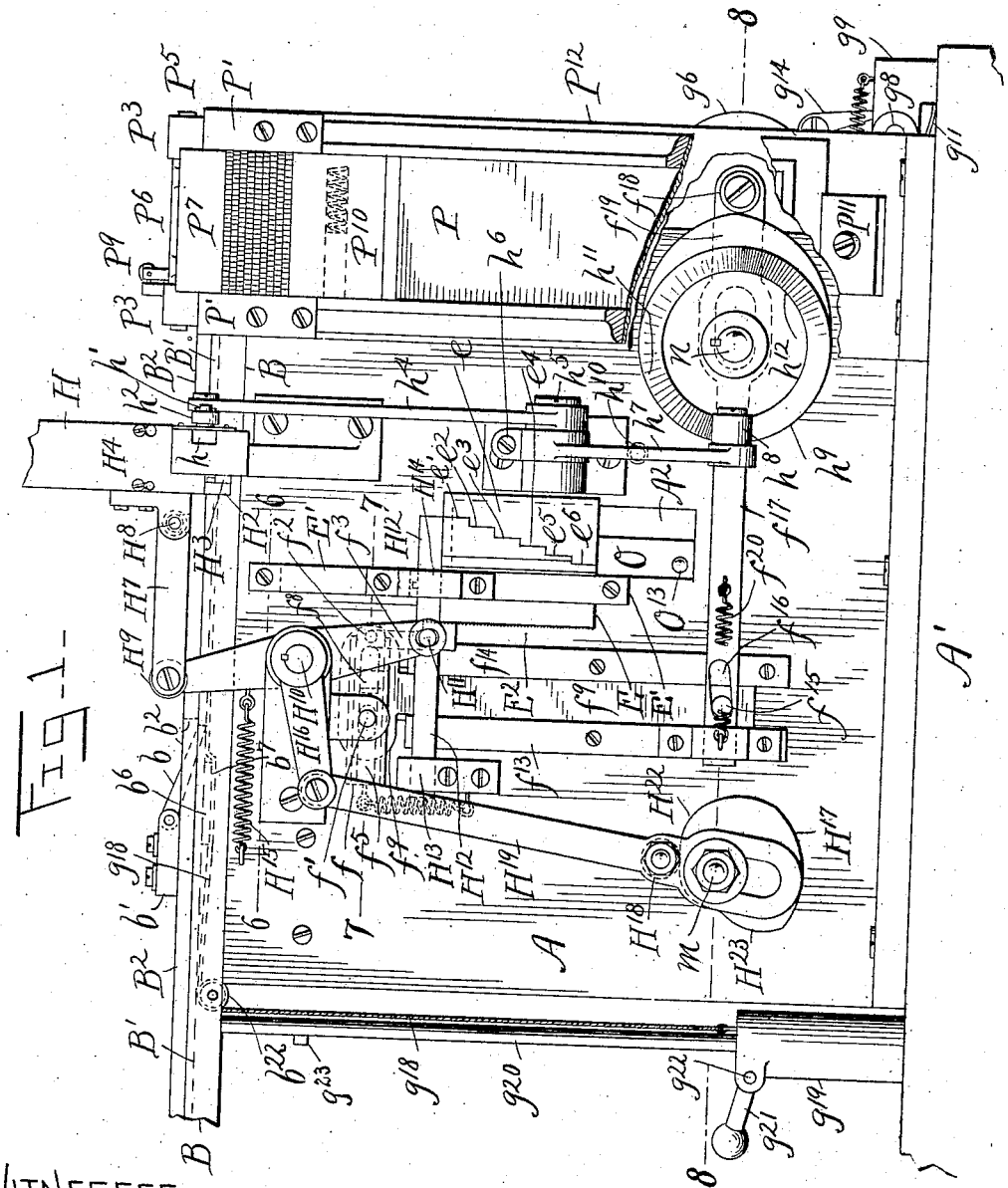

No. 848,808.

PATENTED APR. 2, 1907.

F. B. CONVERSE, Jr.
JUSTIFYING MECHANISM.
APPLICATION FILED FEB. 5, 1900.

8 SHEETS—SHEET 1.

WITNESSES
E. B. Gilchrist
F. D. Ammen

INVENTOR
Francis B. Converse, Jr.
By his Attorneys
Thurston & Bates

No. 848,808.

PATENTED APR. 2, 1907.

F. B. CONVERSE, Jr.
JUSTIFYING MECHANISM.
APPLICATION FILED FEB. 5, 1900.

8 SHEETS—SHEET 3.

WITNESSES
E. B. Gilchrist
F. D. Ammen

INVENTOR
Francis B. Converse, Jr.
By his Attorneys,
Thurston & Bates

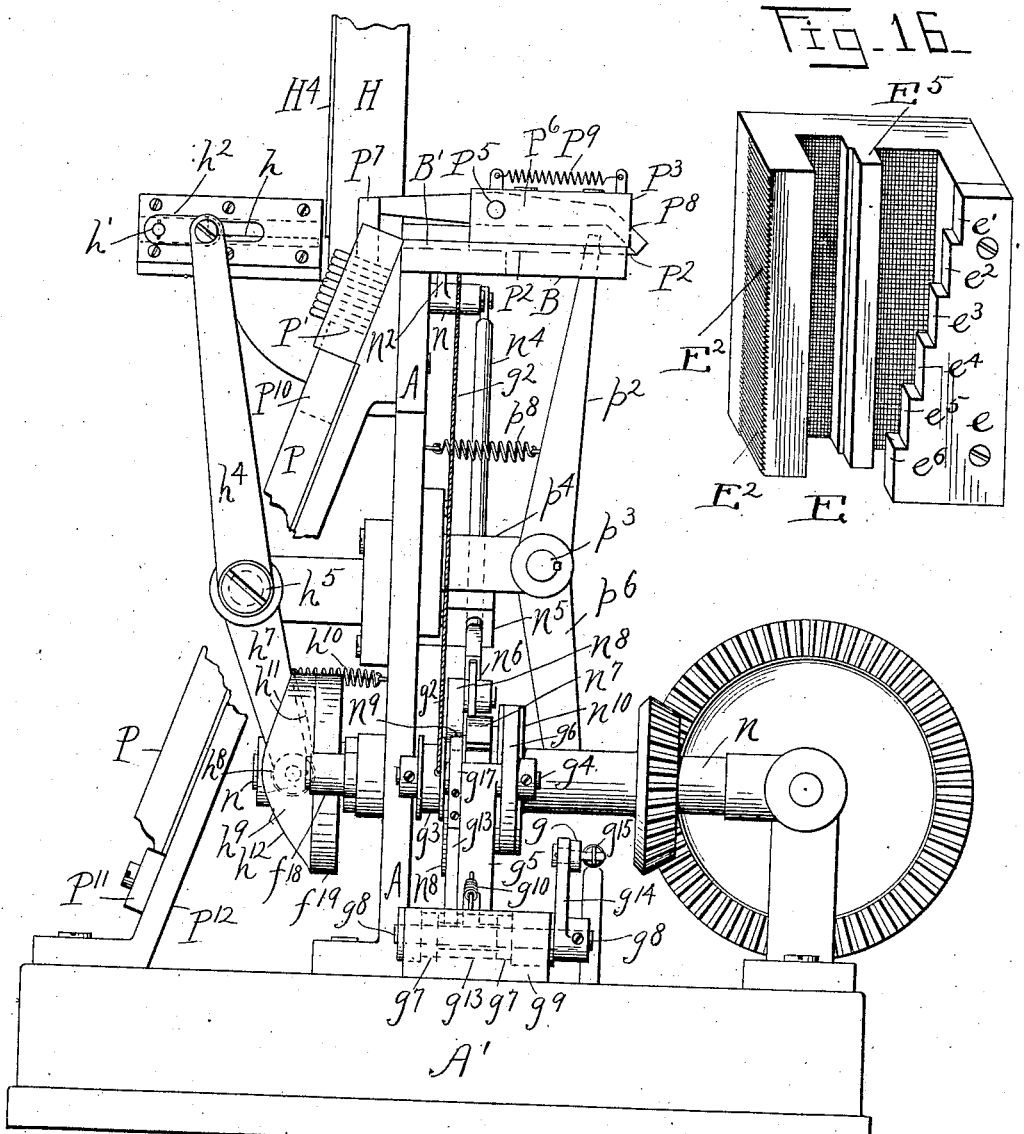

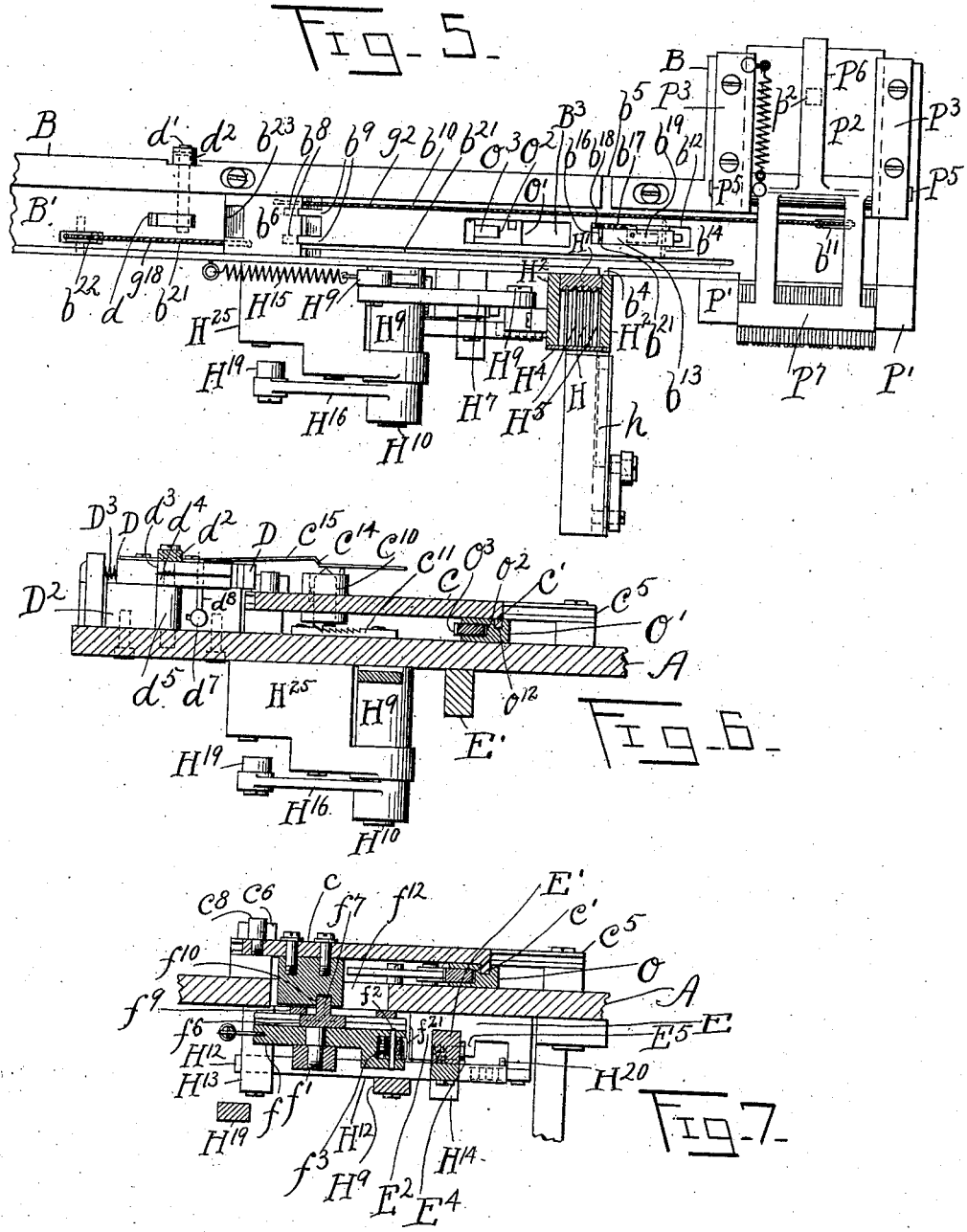

No. 848,808. PATENTED APR. 2, 1907.
F. B. CONVERSE, Jr.
JUSTIFYING MECHANISM.
APPLICATION FILED FEB. 5, 1900.

8 SHEETS—SHEET 6.

WITNESSES
E. B. Gilchrist
F. D. Ammen

INVENTOR
Francis B. Converse, Jr.
By his Attorneys
Thurston & Bates

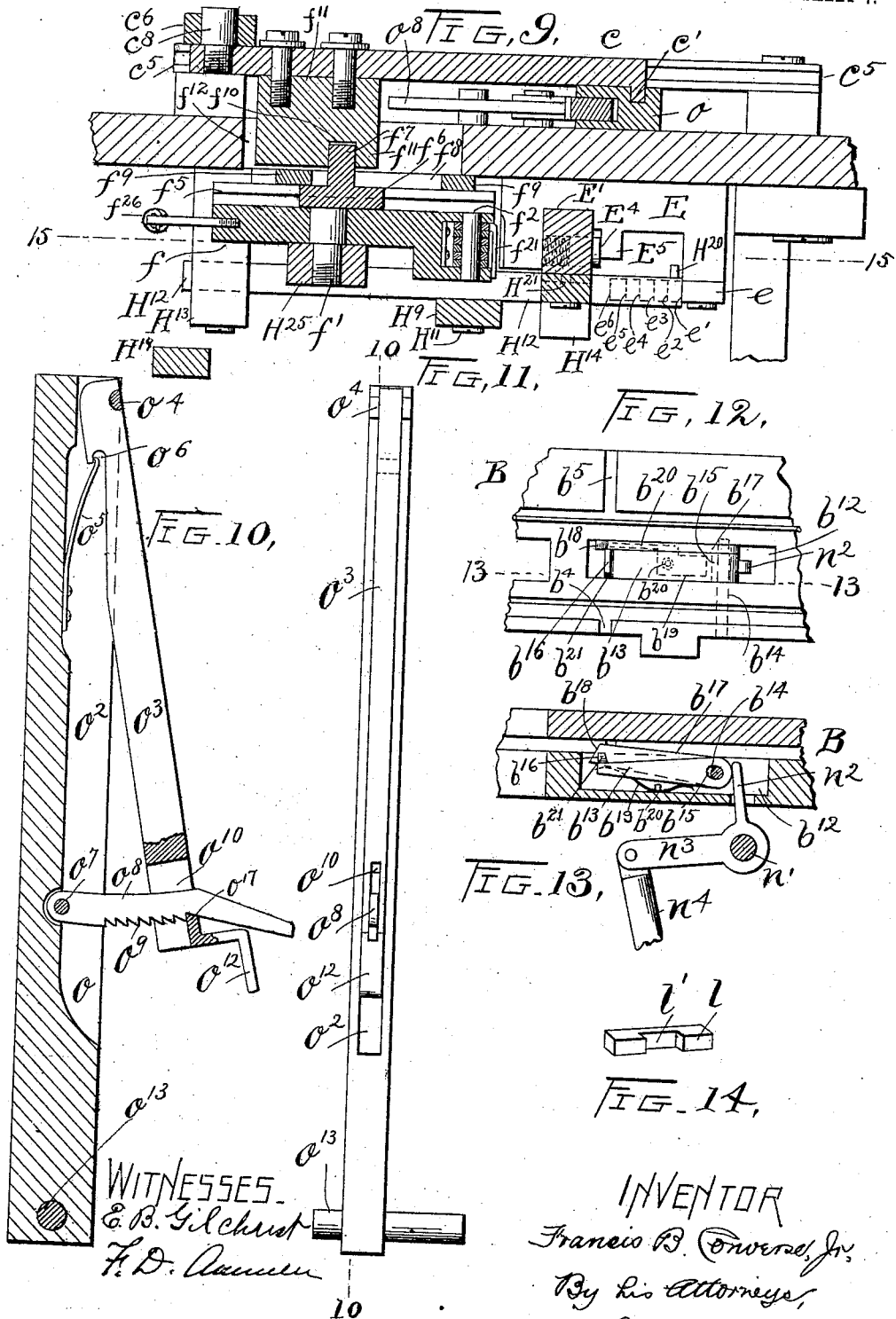

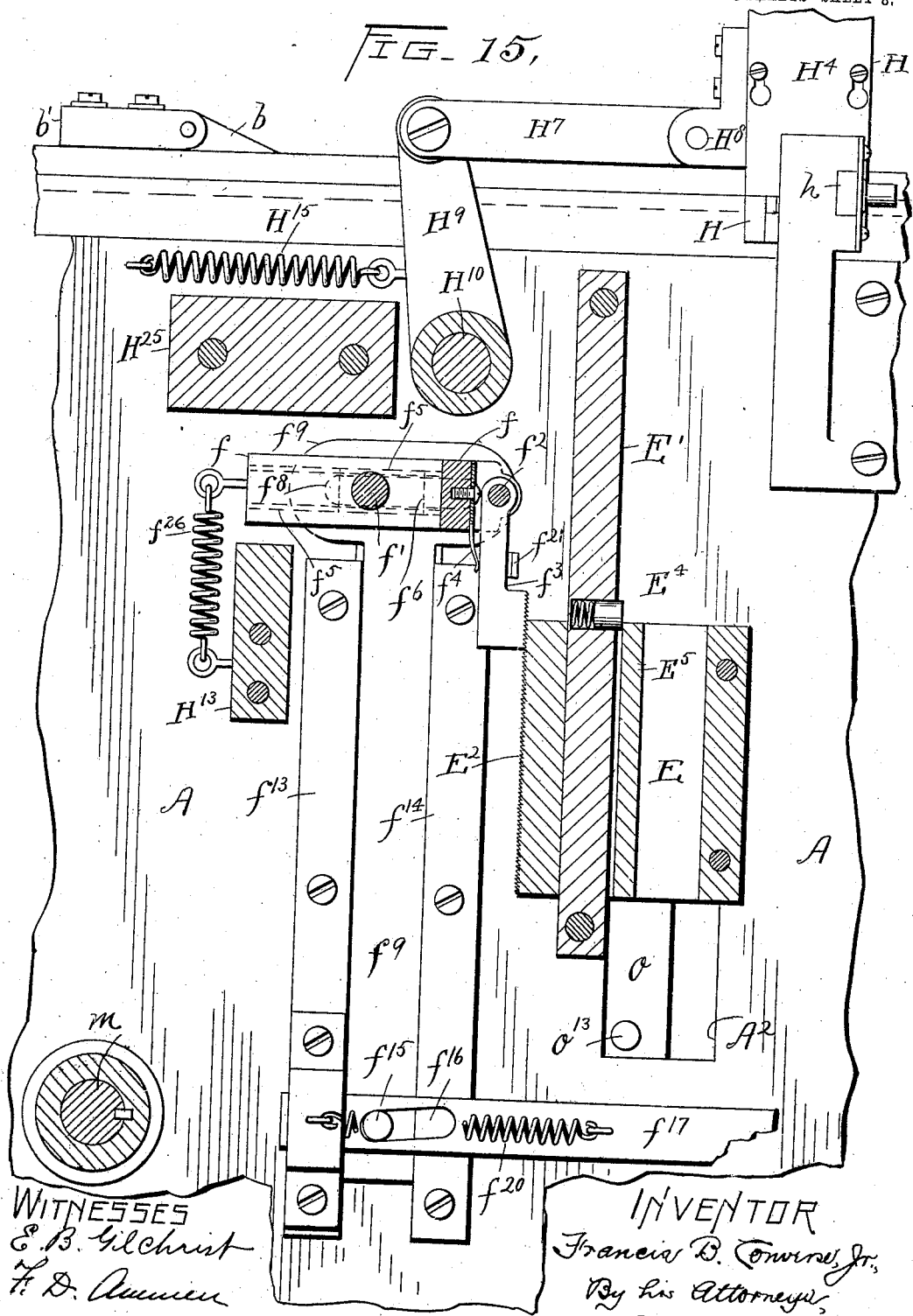

UNITED STATES PATENT OFFICE.

FRANCIS B. CONVERSE, JR., OF LOUISVILLE, KENTUCKY, ASSIGNOR, BY MESNE ASSIGNMENTS, TO THE CLEVELAND TYPESETTER COMPANY, OF CLEVELAND, OHIO, A CORPORATION OF OHIO.

JUSTIFYING MECHANISM.

No. 848,808.      Specification of Letters Patent.      Patented April 2, 1907.

Application filed February 5, 1900. Serial No. 4,124.

*To all whom it may concern:*

Be it known that I, FRANCIS B. CONVERSE, Jr., a citizen of the United States, residing at Louisville, in the county of Jefferson and State of Kentucky, have invented a certain new and useful Improvement in Justifying Mechanisms, of which the following is a full, clear, and exact description, reference being had to the accompanying drawings.

The object of my invention is to provide a simple, durable, and efficient machine for the justification of type by the selection from pre-existing different-sized spaces those which will in the aggregate equal the aggregate of space required, while individually they approximate as near as possible the theoretic equal individual spaces.

A machine constructed on the basis of this invention may justify any kind of type, which word herein includes both the printer's type (cameo) and the matrices of a line-casting machine.

I have herein shown the invention applying to a machine for justifying with rigid permanent spaces a line of printer's type fed to the machine with temporary spaces between the words, and the complete machine includes means for taking account of the number of temporary spaces in the line, for varying the measuring mechanism accordingly, for advancing the line, and for delivering the justified line to a galley. These mechanisms are simply illustrations, however, of several which might be employed in conjunction with my fractional spacing mechanism (which is the gist of the present invention) and are not claimed herein. With the exception of the delivery mechanism, they are shown and claimed in my pending application, Serial No. 3,280, filed January 30, 1900, and the present description thereof is taken almost literally therefrom.

The invention consists, broadly, of measuring mechanism which has a movement according to the size of individual space theoretically required, a selecting-block having a series of steps, and a connection between said steps and the spaces to be in the justified line, combined with means for causing initial movement between the block and connection according to the measuring mechanism and mechanism for causing a periodic movement thereof, which is a fraction of a step equal to the reciprocal of the number of spaces to be justified. The invention comprehends this fractional spacing mechanism broadly and more or less specifically, as illustrated, including it by itself and in combination with the other mechanism.

The invention may therefore be conveniently summarized as consisting of the combination of parts herein illustrated, and specified in the claims.

Figure 2:
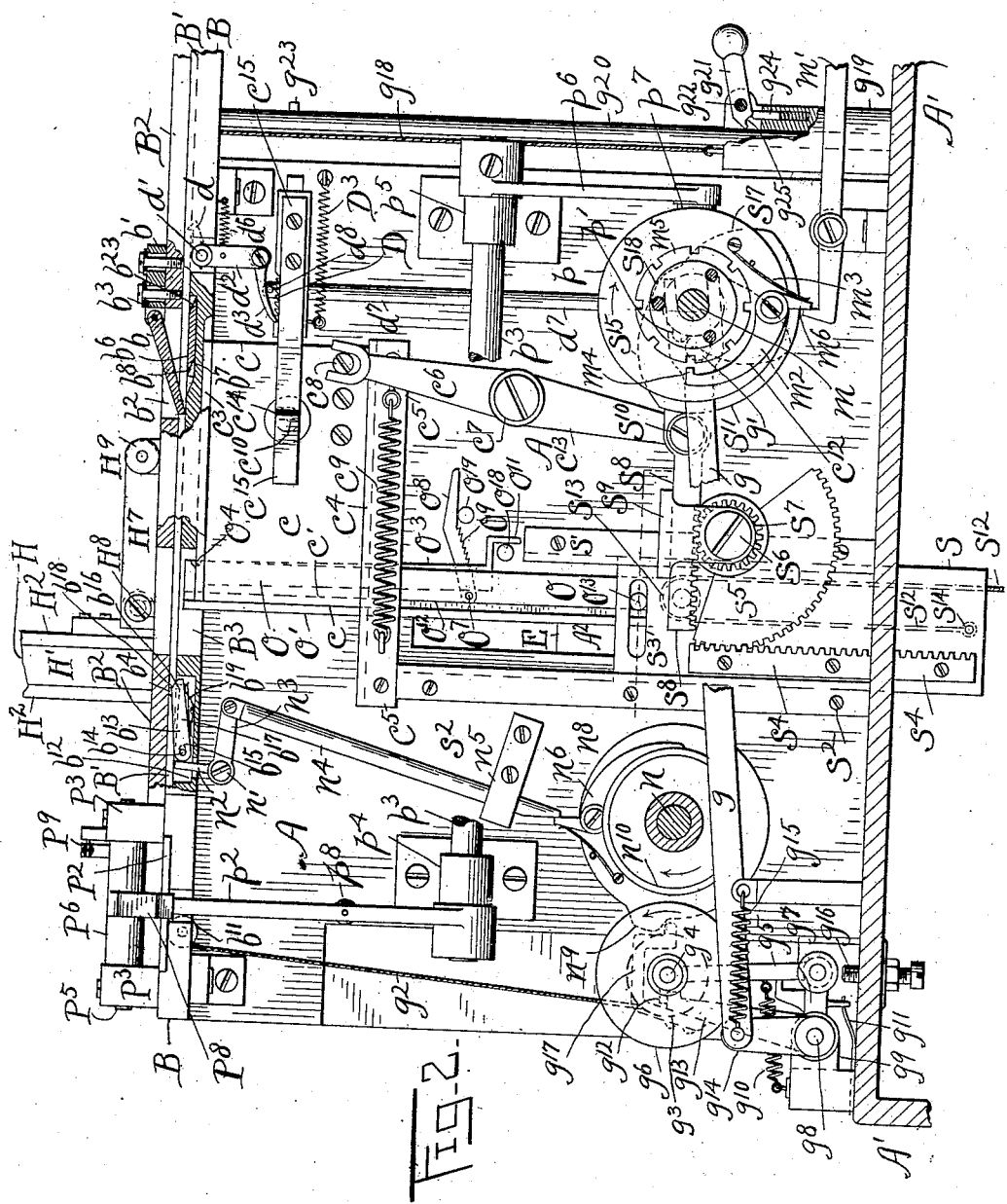
Figure 3:
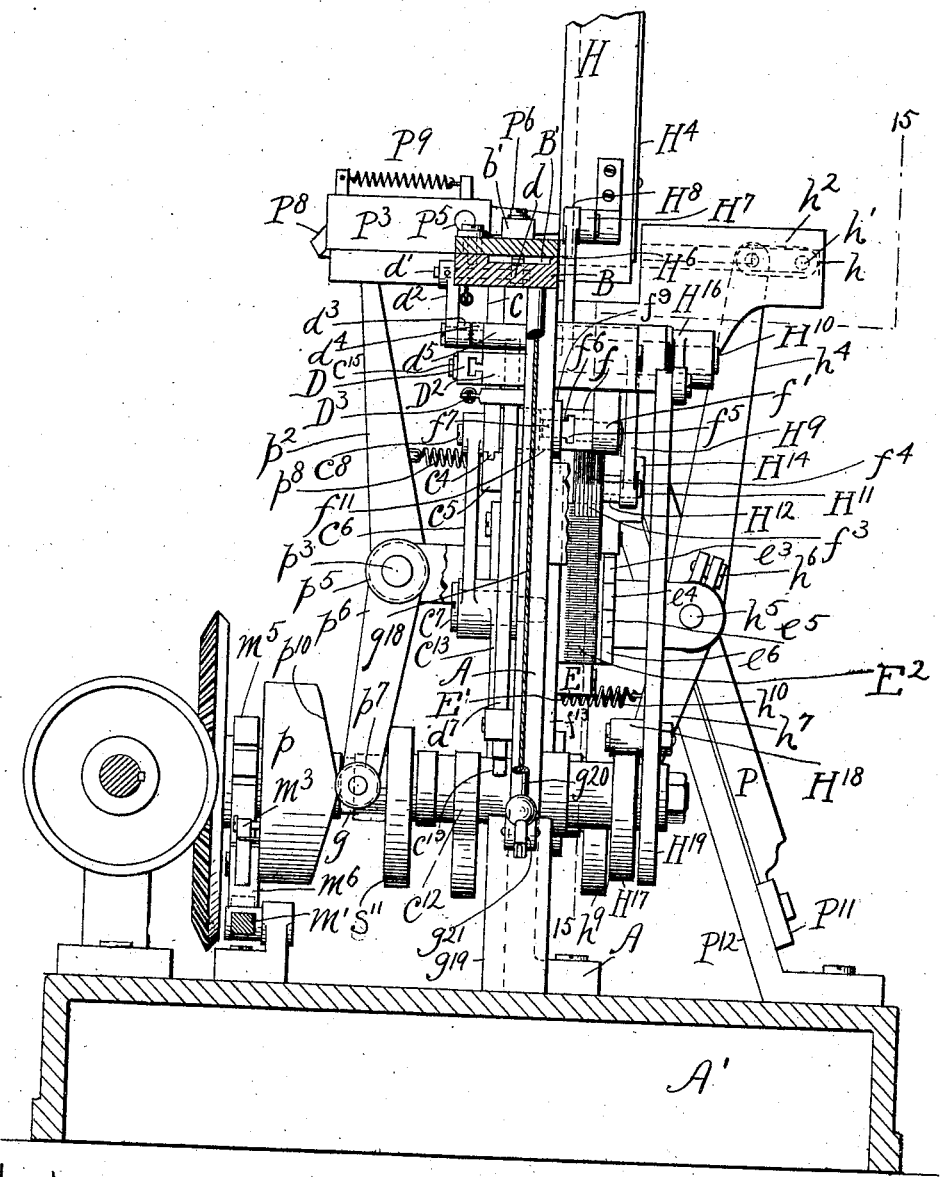
Figure 8:
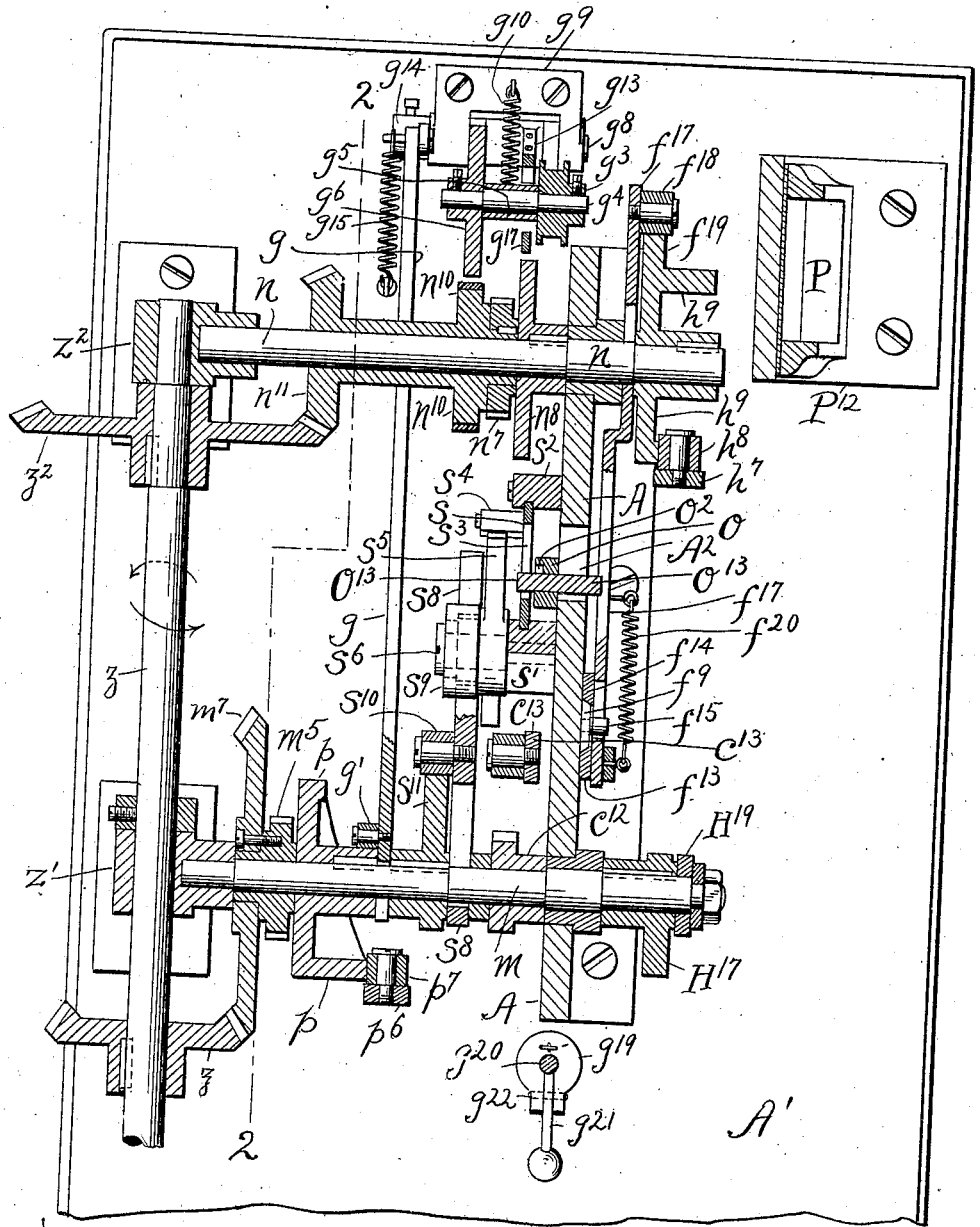

In the drawings, Figure 1 is a front elevation of the machine. Fig. 2 is a rear elevation thereof. Figs. 3 and 4 are end views of the machine, Fig. 3, looking from the left-hand end and Fig. 4 from the right-hand end. Fig. 5 is a plan. Figs. 6, 7, and 8 are horizontal sections of the correspondingly-numbered lines on Fig. 1. All these figures are on the same scale, which is twice that of the succeeding figures. Fig. 9 is an enlargement of Fig. 7. Figs. 10 and 11 are respectively a side elevation and edge view of the measuring-wedge. Figs. 12 and 13 are respectively a plan and a sectional elevation of the trip governing the line-advancing mechanism, Fig. 13 being on the line 13 13 of Fig. 12. Fig. 14 is a perspective view of the temporary space employed in this particular machine. Fig. 15 is a vertical section on the line 15 15 of Figs. 3 and 9, showing the fractional spacing-yoke, &c. Fig. 16 (on the same sheet as Fig. 4) is a perspective view of the space-selecting block.

*Frame.*—The mechanism for the most part is supported on a vertical plate A, which rises from the bed A' and carries upon its upper edge the plate B, in which is formed the type-channel B', through which the type passes in the operations of justification. This type-channel is intended to connect at the left of Fig. 1 with any suitable type-setting-machine which feeds into the channel lines of type with interspersed temporary spaces.

*Space-accounting mechanism.*—The temporary spaces contained between the words as they are fed into the machine are of a form shown in Fig. 14, being of invariable size and having on their under side the notch $l'$. As many words and syllables having been assembled as will fill out the column when spaced by the proper size of permanent spaces supplied by the machine, such line comes into the machine along the channel B', passing beneath the pawl $b$, Figs. 1, 2, 3, and 5, which is pivoted to the block $b'$ and lies in an opening $b^2$ in the plate $B^2$, which covers the justifying-channel. The line comes to rest in advance of this pawl $b$, which drops behind the line and forms a fixed stop against which the line is compacted as it is being measured. As the line is coming into such position, however, it operates the space-accounting mechanism, which takes account of the number of temporary spaces in the line. This is accomplished by the following mechanism: Secured to the rock-shaft $d'$, Figs. 2 and 5, at one end is the rock-arm $d$ and at the other the arm $d^2$; the former arm having a nose projecting up into the type-channel and the latter arm a pawl $d^3$, engaging with the rack D, slidable on the face of the guide-block $D^2$, Fig. 6. When the first type in the line engages with the nose, it rocks the shaft $d'$ and moves the rack D to the left in Fig. 2 one tooth. The rack D is held in this position by the pawl $d^4$, Fig. 6, by the side of the pawl $d^3$, and as soon as a temporary space comes over the nose of the pawl $d$ the latter springs up into the notch $l'$ therein, and the pawl $d^3$ is drawn back, so as to engage the next tooth of the rack, which it advances as the succeeding type engages the nose of the arm $d$. Thus the rack is advanced one more tooth than there are temporary spaces in the line; but the rack in its initial position (shown in Fig. 2) stands one tooth to the right of its true zero position, and being advanced one more tooth than the number of the temporary spaces in the line it will be left standing as many teeth to the left of its zero position as there are temporary spaces. Fig. 6 shows the rack as left by a line containing one temporary space.

At the same time that the line is advanced to the position ahead of the pawl $b$ the lever-arm $m'$, Fig. 2, (which may be operated from the setter,) has its outer end raised, which releases the tail $m^6$ of the pawl $m^2$, which is carried on the back side of the disk $p$, secured to the shaft $m$. This shaft, Fig. 8, is journaled in the plate A and in a bearing $Z'$ and has loosely surrounding it a bevel-gear $m^7$, continuously revolved by the bevel-gear $z'$ on the continuously-driven power-shaft $z$. As soon as released the pawl $m^2$ is pressed by the spring $m^3$, so that its nose $m^4$ engages with the notched disk $m^5$, which is secured to the bevel-gear $m^7$. Thus whenever the lever $m'$ is actuated, as it is for each line fed into the machine, the shaft $m$, which I term the "line-shaft," is caused to rotate. Before it completes a rotation, however, the lever $m'$ (having been released by its operating means) swings back under the influence of gravity to bring its upwardly-turned end into the path of the tail $m^6$ of the pawl, and thus as that pawl comes into engagement with it its nose becomes withdrawn from the notched disk and the shaft $m$ comes to rest, making just a complete rotation.

The rotation of the shaft $m$ accomplishes several results: First (in logical order) it carries the measuring-wedge $o$ away from the pawl $b$, which forms the measuring-abutment in the type-channel, a distance equal to the aggregate thickness of the temporary spaces in the line to be justified, thus eliminating those temporary spaces from the calculation. The line-shaft does this by causing movement of the plate $c$, Figs. 2, 6, and 9, which carries the wedge $o$. This plate is held in a vertical position beneath the plate B, being guided to move in a horizontal path by the rail $c^5$ and in a groove in the under side of the plate B, and it is advanced to the left of Fig. 2 by the spring $c^9$ (acting through the lever $c^6$ and stud $c^8$) whenever allowed by the cam $c^{12}$, Fig. 8, which bears against the roller carried by the arm $c^{13}$, which is a rigid prolongation of the arm $c^6$, this lever being journaled at $c^7$. When thus allowed to move to the left of Fig. 2, the plate $c$ does so until the detent-pin $c^{10}$, carried by the plate, engages the beveled shoulder $c^{14}$ of the spring $c^{15}$, which is carried by the rack D. As soon as such engagement does take place, however, the incline $c^{14}$ forces the detent $c^{10}$ inward into engagement with the rack $c^{11}$, Fig. 6, on the frame A. Thus the plate $c$ is locked a distance from its initial position proportional to the number of temporary spaces in the line. In the present machine this distance is just equal to the aggregate of the thickness of those temporary spaces.

*Measuring-wedge.*—The measuring inclined blade is preferably a part of the composite measuring-wedge $o$, which is shown in detail in Figs. 10 and 11. It consists of the bar $o'$, of rectangular cross-section, with a groove $o^2$ on its narrow edge, into which fits a blade $o^3$, which is pivoted thereto at its upper end. This pivoting is accomplished by the use of the half-cylindrical pin $o^4$, fixed to the blade flush with its edge and occupying corresponding semicylindrical depressions in the edge of the bar $o'$, a spring $o^5$, fixed into the bottom of the groove $o^2$ and engaging in a notch $o^6$ in the blade, holding the two parts together. The wedge is provided with a locking mechanism consisting of the segmental piece $o^8$, having a series of teeth $o^9$, accurately cut upon its lower face, pivoted to the bar $o'$ at $o^7$ and passing through an opening $o^{10}$ in the blade, the lower end of which opening is formed into a tooth to engage with the segment and lock the blade at a corresponding angle to the bar $o'$. These teeth $o^9$ are so spaced as to be capable of holding the blade $o^3$ at various angles to the bar $o'$, the tangents of which angles are respectively in the ratios of 1:2:3:4, and so on, according as the first, second, third, fourth, &c., is engaged. Thus a variable wedge is formed, which has its pivot at the axis of the semicylindrical pin $o^4$ and which has a taper expressed by the ratios 1:L, 2:L, 3:L, &c., where L is the length of the blade, and the blade is engaged by the first, second, third, &c., tooth of the segment $o^8$. This variable wedge stands with its upper end in an opening $B^3$ in the bottom of the justifying-channel B′ and lies between the frame-plate A and the plate c, being held there against horizontal movement by the rib c′, Fig. 6, carried by the plate taking into the groove $o^{12}$ in the side of the wedge. Thus as the plate is moved toward the left of Fig. 2 a distance equal to the aggregate thickness of the temporary spaces, as heretofore stated, the blade's pivot is thereby moved parallel with the line the same amount, and this movement varies the taper of the wedge a corresponding amount by reason of the lower edge of the blade of the wedge being held stationary by the downward projection $o^{11}$, which takes over the stationary pin $o^{18}$. Thus by the same movement the room occupied by the temporary spaces in the line is eliminated from the measuring calculation, and the measuring-wedge is varied in taper according to the number of spaces to be justified.

*Setting the wedge and measuring the line.*— While the preceding operations were taking place the concentric face of the cam $s^{11}$, Figs. 2 and 8, was passing the roller $s^{10}$ on the slidable link $s^8$. When a decreasing face $s^{17}$, however, comes opposite this roller, the latter is allowed thereby to move to the right in Fig. 2, and thereupon a suitable force (as a spring or weight, not shown) pulling down on the cord $s^{12}$, which passes over the sheave $s^{13}$ and is secured at its end to the slide s at $s^{14}$, raises the latter, the rack $s^4$, carried thereby, rotating the segment $s^5$, the pinion-teeth $s^7$ of which mesh with the teeth on the link $s^8$, carrying the roller $s^{10}$. Now this slide s is connected with the wedge by means of a horizontal slot $s^3$, into which takes a pin $o^{13}$ from the wedge. From this construction it results that the slide does not interfere with the horizontal movement of the wedge according to the number of temporary spaces, but operates to elevate the wedge when the cam $s^{11}$ permits. Now as the wedge begins to rise, the tooth $o^{17}$, formed on the under side of the opening $o^{10}$ of the blade $o^3$, engages the segment, the end of which has been resting on a stationary pin $o^{19}$, and the blade is thereby held at an angle determined by the tooth of the segment engaged, and during the remainder of the elevation the blade and back of the wedge are rigid with each other. The wedge in this condition rises until it is stopped by compacting the line of type and temporary spaces between the inclined blade $o^3$ and the end of the pawl b.

Since the taper of the wedge is proportionate in every case to the number of spaces for justification in the line measured and since the space measured in the aggregate is equal to the product of the number of spaces by their proper theoretic thickness, it follows that for a definite size of space required to justify the line the wedge will rise a definite distance irrespective of the number of spaces in the line. Thus if a line which can be exactly justified by the insertion of spaces three units in thickness, for example, requires six such spaces it will be short by an amount six times as great as if it required but one such space; but the taper of the wedge will be for the six-space line six times as great as for the one-space line. It follows, therefore, that the wedge rises proportionately to the size of the spaces required between words and independently of the number of such spaces. Now as the wedge rises it lifts (by means of the pin $o^{13}$, projecting through an opening $A^2$ in the frame) a block E, which carries a stepped surface corresponding to the different sizes of spaces which the machine provides, which operates, as hereinafter explained, to select the proper size of spaces. This selecting-block E is shown in perspective detached in Fig. 16 and in coöperation with the other parts in Figs. 1, 3, 7, 9, and 15. After being raised by the wedge it is retained in its elevated position, as hereinafter described. When the wedge ceases to rise by the line becoming compacted between it and the pawl b, the cam $s^{11}$ continues to rotate idly until the increasing face $s^{15}$ meets the roller $s^{10}$ on the rack $s^8$, when the cam causes the depression of the plate s, which draws down the wedge to its initial position.

From what has been described it will be seen that the block E is given an elevation by the wedge dependent conjointly on the number of spaces in the line and the shortness of the line, and thus that its position comprehends the two factors whereby it may determine the theoretic size of space required to justify the line. If the spaces were specially cast or cut off from the end of the space-timber, this would be all that was required. The present invention, however, goes farther and provides means whereby with a few sets of definite-sized permanent spaces the selecting-block may select the proper number of spaces of the size next larger than the theoretic size and the proper number of the size next smaller to make the required aggregate. I will now take up the description of this part of the mechanism.

*Space-case and its connection with the selecting-block.*—The supply of permanent spaces is contained in a vertical space-case H, Figs. 1 and 5, six different sizes being used in the machine shown. This space-case is of any desirable length and consists of a back H′ and two sides $H^2$, closed at their lower ends by a bottom $H^3$ and in front by a removable cover $H^4$. The case is divided by partitions $H^5$ into channels of the proper width to contain the different sizes of spaces. The spaces rest in these channels on their edges, (in the machine shown,) the thickest size being in the channel at the left of the case, Fig. 1, and the size of each channel decreasing toward the right. The thinnest space here used is .03 inch in thickness and the sizes increase uniformly by .01 inch, forming a series of .03, .04, .05, .06, .07, .08 inch in thickness. The partitions in the space-case are of varying thickness to compensate for the varying thickness of spaces, so that the distances from the left-hand side of any channel to the corresponding point of the next channel are uniform.

The lower end of the space-case, preferably pivoted near its upper end, as shown in my Patent No. 738,741, issued September 8, 1903, is movable laterally to bring any channel therein in front of an ejector $h$, Figs. 1 and 4, which when operated enters the channel at its lower end below the removable front $H^4$ and shoves the lowest space from the channel through an opening $H^6$, Fig. 3, in the back of the case into the justifying-channel, the space entering the justifying-channel through an opening $b^4$, Fig. 5, therein.

A connecting-link $H^7$, Figs. 1 and 5, hooked to a stud $H^8$ on the side of the space-case, is pivoted at the end of the offset walking-beam $H^9$, which is fastened to the rock-shaft $H^{10}$ and engages, by means of a slot on its lower end, a pin $H^{11}$ on the plunger $H^{12}$. This plunger $H^{12}$ slides in suitable bearings $H^{13}$ $H^{14}$, carried by the frame A, and according as its right-hand end engages one or another of the steps $e'$ to $e^6$ of the plate $e$, which forms part of the block E, determines the position of the space-case, the spring $H^{15}$ tending to move the case to the left and the step of the selecting-block limiting such movement.

Now the selecting-block E is so placed and proportioned that when the plunger engages the first step $e'$ at the upper end of the block the right-hand channel of the space-case, which contains the thinnest size, is in line with the ejector $h$. If the block should be elevated enough for the plunger to rest on step $e^2$, the second size of spaces would be in line with the ejector, &c., the horizontal dimensions of the steps $e'$ to $e^6$ being determined by distance between successive space-channels in the space-case and the leverage of the connection between it and the block. Thus the series of steps on the block correspond to the series of spaces in the space-case and determine the size of permanent space to be inserted according to the step in engagement.

Preceding the raising of the wedge to measure the line, as heretofore described, an increasing face $H^{22}$ on the cam $H^{17}$, Fig. 1, on the line-shaft meets the roller $H^{18}$ of the link $H^{19}$ (which link is pivoted to an arm $H^{16}$ on the shaft $H^{10}$) and rocks the shaft $H^{10}$, swinging the space-case toward the right and withdrawing the plunger from the path of the block. The block is now free to slide vertically between the frame-plate A and the guide $E'$ and is accurately guided, but is free enough to descend by its own weight. It carries the vertical rack $E^2$ of small teeth whereby, as hereinafter explained, it is shifted during the justification for the fractional spacing.

The longitudinal or vertical dimension of the steps of the selecting-block is equal to the travel of the wedge for a line shortage equal to the difference between the thickness of successive sizes of permanent spaces—in the present machine one-hundredth of an inch. If the thinnest size of spaces provided by the machine (.03 inch) is required throughout the line, the block E will be raised by the measuring mechanism, heretofore described, until the lower end of the top step $e'$ is in line with the lower edge of the plunger $H^{12}$, there being a gap between the pin $o^{13}$ of the wedge and the lower end of the selecting-block to allow idle movement of the wedge until its incline comes into the type-channel, and thereafter for the distance of the two anterior steps which would be provided on the selecting-block for the permanent spaces of .01 inch and .02 inch thickness were such employed. If the second size of space provided in the machine (.04 inch) be required, the lower end of the second step $e^2$ is raised into line with the lower edge of the plunger, and so on. If spaces partly of the second and partly of the first size are required, the wedge raises the block higher than it would were the first size alone required, but not so high as it would were the line able to take the second size throughout, and thus the block comes to rest with the plunger on an intermediate portion of a step.

While the wedge is still elevated (during the passage of the concentric face $s^{18}$ of the cam $s^{11}$ past the roller $s^{10}$) the decreasing face $H^{23}$ of the cam $H^{17}$ allows the spring $H^{15}$ to draw the space-case to the left until stopped by the plunger $H^{12}$ meeting whatever step of the block E stands in its path, and this brings the channel containing the corresponding size of spaces in line with the ejector $h$, and the amount which the engaged step extends above the lower edge of the plunger determines the number of that size of spaces that must be inserted before the size is changed. After the block is engaged by the plunger and the wedge lowered the pressure of the spring $H^{15}$, acting through the plunger on the block, prevents the block from descending.

*Advancement of line to bring first temporary space into substituting position.*—Following the operations above described, a lug $p'$, Fig. 2, on the hub of the disk $p$, acting upon the roller $g'$, Figs. 2 and 8, on the link $g$, throws into action mechanism to advance the line along the justifying-channel until stopped with the first temporary space alined with the opening $b^4$, Fig. 5, through which a permanent space may be moved into the line, and a coöperating opening $b^5$ on the other side of the channel, through which the temporary space may be ejected. This mechanism is as follows: A follower $b^6$, Figs. 2 and 5, of the same thickness as the body of the type, rests in a depression $b^7$ in the bottom of the type-channel B′. Inclined grooves $b^8$ are cut in the forward end of this follower, into which extend corresponding projections $b^9$, Fig. 5, from the bottom of the channel, forming inclines upon which the follower may rise when advanced, and bridging over the gap in front of the follower to permit a smooth passage of the type along the channel. A "cord" (which term I use as including any flexible pulling member) $g^2$, attached to this follower, lying in a groove in the type-channel, runs over a roller $b^{11}$ and is fastened to a winding-drum $g^3$. The drum $g^3$, Figs. 2, 4, and 8, is on a shaft $g^4$, journaled intermediately in the upper end of an arm $g^5$ and carrying at its other end a disk $g^6$, designed to be rotated by the continuously-revolving disk $n^{10}$ when brought into contact with it. This disk $n^{10}$ has a friction-surface of rubber or other material and is carried on the hub of the beveled gear $n^{11}$, which loosely surrounds the shaft $n$ (journaled in the bearing $Z^2$ in the plate A and the standard $A^2$) and is continuously revolved by the meshing bevel-gear $z^2$ on the power-shaft $z$. The arm $g^5$ is pivoted on a horizontal arm $g^7$, Fig. 2, which in turn is journaled on the shaft $g^8$, carried in the stationary bearing-block $g^9$. A spring $g^{10}$ tends to draw the arm $g^5$ away from the shaft $n$ and normally holds the disk $g^6$ out of contact with the revolving disk $n^{10}$, while a leaf-spring $g^{11}$ pulls downward on the arm $g^7$. A lug $g^{12}$ on the arm $g^5$, overhanging the end of a detent-arm $g^{13}$, holds the parts in the position shown, the disks being out of contact and the arm $g^7$ being held up against the tension of its spring $g^{11}$. The detent-arm is fixed to the rock-shaft $g^8$, to which is also fixed the rock-arm $g^{14}$, connected by the link $g$ with the roller $g'$, with which the cam-lug $p'$, heretofore referred to, engages, a spring $g^{15}$ drawing the link toward the cam.

Now as the lug $p'$, Fig. 2, on the hub of the disk $p$ passes the roller $g'$ toward the end of the rotation of the line-shaft $m$ the detent-arm $g^{13}$ is swung from under the lug $g^{12}$ and the spring $g^{11}$ draws the arms $g^7$ and $g^5$ down as far as permitted by the adjusting-screw $g^{16}$. This brings the lug $g^{12}$ on the arm $g^5$ opposite the end of the detent $g^{13}$, and the lug $p'$ having passed the roller on the link $g$ the spring $g^{15}$ draws the detent and with it the arm $g^5$ toward the shaft $n$, forcing the disk $g^6$ into engagement with the disk $n^{10}$ and causing the former to rotate.

The rotation of the disk $g^6$ rotates the shaft $g^4$ and the drum $g^3$, and thus winds the cord $g^2$ upon the drum, advancing the follower $b^6$ along the justifying-channel. The follower rises out of the depression $b^7$ and passes under the pawl $b$, and thus engages the rear end of the line of type and shoves it along until it is stopped positively by the first temporary space in the line coming between the injection and ejection openings $b^4$ and $b^5$ and engaging the word-shaft trip $b^{13}$, (which initiates the action of the space selecting and inserting mechanisms, as hereinafter described,) whereupon the line thus comes to rest. The continued pull of the winding-drum $g^3$ upon the now locked cord $g^2$ causes the drum to lift itself until the lug $g^{12}$ rises above the end of the trip $g^{13}$, whereupon the spring $g^{10}$ draws the disk $g^6$ out of engagement with the disk $n^{10}$.

Seated within a recess $b^{12}$, Figs. 2, 5, 12, and 13, in the bottom of the justifying-channel B′ is a trip $b^{13}$, fulcrumed on a horizontal stationary pin $b^{14}$, which passes through a slotted hole $b^{15}$ in the trip. This trip rests normally with its upwardly-turned nose $b^{16}$ below the bottom of the channel. Pivoted on the pin $b^{14}$ by the side of the trip $b^{13}$ is a dog $b^{17}$, the beveled end $b^{18}$ of which projects into the channel, being sustained in its raised position by a double-ended leaf-spring $b^{19}$, loosely held at $b^{20}$, concave upward and having one end beneath the dog and the other beneath the trip. As the type advances the dog is depressed, pressing down one end of the leaf-spring, and thereby causing the other end to press the trip upward against the under side of the line of type.

As the first temporary space in the line comes over the nose of the trip the trip springs into the notch in the temporary space and is engaged by the next succeeding type, the movement of which advances the trip the length of the slot $b^{15}$, when the line is thereby stopped positively, and the frictional advancing mechanism throws itself out of engagement, as heretofore described. The line now stands with a temporary space registering with the injection and ejection openings $b^4$ $b^5$ in the side of the justifying-channel, while the movement just given to the trip initiates, as hereinafter explained, the space insertion and the fractional space adjustment.

Summarizing the operations of the line-shaft, a single rotation thereof operates, first, to vary the taper and lateral position of the wedge according to the number of spaces in the line; second, to move the wedge longitudinally to measure the line, with the consequent initial setting of the selecting-block, and, third, to throw into engagement the mechanism (operated by the constantly-rotating part of the word-shaft) to cause the advancement of the line into position to receive the first permanent space, thereby initiating the inserting and fractional adjusting operations, the line-shaft mechanisms returning to their normal position by the end of its rotation.

*Space substituting and subsequent advancement of line.*—The trip $b^{13}$, Figs. 2, 12, and 13, as it moves with the advancing type the distance allowed it by the slot $b^{15}$ swings the vertical arm $n^2$ of a bell-crank lever $n'$, causing the other arm $n^3$ to draw up the rod $n^4$ pivoted to it, which passing through a suitable guiding-block $n^5$ forms a lock for the pawl $n^6$ of the clutch on the shaft $n$, which from its function I call the "word-shaft." This clutch is similar to the one on the line-shaft $m$ and consists of a notched disk $n^7$, Fig. 8, continuously rotating, (being loose on the shaft and secured on the hub of the bevel-gear $n^{11}$, which is loosely journaled on the shaft $n$,) and a disk $n^8$, keyed to this shaft and carrying a pawl $n^6$. When the bell-crank lever $n'$ is actuated by the trip, the rod $n^4$ is withdrawn from engagement with the tail of the pawl $n^6$, permitting the nose of the pawl to engage the notched disk and causing a rotation of the word-shaft $n$.

The word-shaft in rotating performs continuously three successive operations for each space in the line, each group of these three operations being performed in one rotation of the shaft. These operations are, first, ejecting the space into the line and shoving therefrom the temporary space in front of it; second, actuating the advancement of the line to bring the next temporary space into the substituting position, and, third, readjusting the space-selecting block to cause at the proper time the selection of a different size of spaces for the remainder of the line. The parts performing this last operation I term the "fractional spacing mechanism." I will now take up the first two operations briefly and then the third more extendedly.

The first operation of the word-shaft in rotating is to eject a permanent space from the space-case into the line in place of the temporary space. This is accomplished by the following mechanism: The lever $h^7$, Figs. 1, 3, and 4, carrying the roller $h^8$, is clamped by the screw $h^6$ on the hub of the lever-arm $h^4$, which arm is fulcrumed on the stud $h^5$ and is connected by a link $h^2$ with the stud $h'$ on the horizontally-guided ejector $h$. Therefore when in the rotation of the shaft $n$ an increasing face of the crown-cam $h^9$ acts on the roller $h^8$ the ejector is forced into the space-case, pushing out a permanent space against the end of the temporary space in the justifying-channel and shoving that temporary space out of the channel through the exit-opening $b^5$. In this ejection movement the corner of the notch $l'$ in the temporary space $l$, Fig. 14, is forced against the inclined corner $b^{21}$, Figs. 12 and 13, of the trip $b^{13}$, and this trip is thus depressed flush with the under side of the line of type. This releases the trip, and the weight of the rod $n^4$ causes the latter to drop to its initial position into the path of the tail of the pawl $n^6$. As the decreasing face $h^{12}$ of the crown-cam $h^9$ passes the roller $h^8$ the spring $h^{10}$ withdraws the ejector. This double stroke of the ejector occupies about three-fourths of the rotation of the word-shaft, the other quarter rotation being used in readjusting the block E by means of the fractional-spacing mechanism.

As the word-shaft $n$ approaches the end of its rotation a lug $n^9$ on the face of the disk $n^8$, Figs. 2 and 8, presses against the arm $g^{17}$, overhanging from the detent $g^{13}$, and throws this detent from beneath the lug $g^{12}$, allowing the latter to drop, as heretofore explained, whereby the two disks $g^6$ and $n^{10}$ come into engagement and the drum $g^3$ is again rotated to advance the line of type. This advancement of the line brings another temporary space into the ejection position, which again withdraws the lock-bar $n^4$ from the path of the pawl $n^6$ and allows another rotation of the shaft, whereby another permanent space is substituted for a temporary one. This sequence of operations is continuous until all of the temporary spaces have been replaced by permanent spaces, when the succeeding advancement of the line, now unimpeded by the trip $b^{13}$, continues until the line is brought to rest at the end of the justifying-channel opposite the galley P, where it remains until the line-shaft is again rotated for the operations of the succeeding line, when it is delivered upon the galley in the manner hereinafter explained.

*Fractional-spacing mechanism.*—I will now describe the fractional-spacing mechanism which operates periodically during the justification of a line to change the position of the selecting-block to cause the shifting of the space-case to another size of space whenever such space is required. It has been already shown that the wedge raises the block E a definite distance proportionate to the thickness of the theoretic space required in the line, and it has appeared that if spaces .03 inch thick are required throughout the line the block is raised until the lower end of the top step $e'$ is in line with the lower edge of the plunger $H^{12}$, and if spaces .04 inch thick are required the lower end of the second step $e^2$ is in such line, and so on. Now, considering a few concrete examples; suppose the line contains five spaces and requires an aggregate of .19 inch to be inserted to justify it. Each space would therefore be .03 4/5 inch in thickness, were it possible to divide them exactly. The wedge therefore raises the block four-fifths of the length of a step above the position indicating the .03-inch size of space—that is, the plunger will rest upon four-fifths of the length of the step corresponding to the .04-inch size of spaces—that is, the step $e^2$. Now by lowering the block one-fifth of the length of a step after the insertion of each space during the justification the plunger will rest on this step during the insertion of four spaces; but the fourth depression (following the insertion of the fourth space) will carry this step clear of the plunger, allowing it to rest on the first step, and thereby causing the selection of .03-inch spaces for the fifth one, thus four .04-inch spaces and one .03-inch space, making the required .19 inch, will be selected. If, for example, the line contained seven spaces and was .47 inch short in the aggregate, each theoretic space would be forty-seven divided by seven or .06 5/7 inch. The wedge would now raise the block five-sevenths of the length of a step above the position for the selecting of .06 inch space—that is, the plunger will rest on the step $e^5$ two-sevenths of its length away from the step $e^6$, and the block being lowered one-seventh of the length of the step for each insertion of a space after five spaces corresponding to the step $e^5$ have been inserted that step will be clear of the plunger and the latter will pass onto the step $e^4$ and the remaining spaces will be of the size determined by that step. Thus there will be five spaces .07 inch in thickness (aggregating .35 inch) and two spaces .06 inch in thickness, (aggregating .12 inch,) making the required .47 inch. From these examples it will be apparent that if after the insertion of each space in the line the block is lowered a definite fraction of the length of the step equal to the reciprocal of the number of spaces to be justified the step upon which the plunger rests will pass from engagement with the plunger after the insertion of the proper number of the corresponding size of spaces, causing the remaining spaces to be of the next smaller size and the two sizes together to properly justify the line. Now the mechanism for causing this intermittent movement of the selecting-block proportional to the number of spaces to be justified is as follows: Pivoted at $f'$, Figs. 1, 3, 7, 9, and 15, to the stationary bracket $H^{25}$ is a lever $f$, carrying on a pivot $f^2$ at its right-hand end a series of depending pawls $f^3$, with teeth adapted to engage the teeth of the rack $E^2$ on the block E, into engagement with which the pawls are pressed by the comb-spring $f^4$. The teeth of the rack are as near together as they may be conveniently made in practice, and the teeth of the different pawls are verniered—that is, while the teeth correspond accurately with the teeth of the rack the pawls are equally spread over the distance between two teeth. Thus if there are six pawls, as shown in the drawings, the teeth of each is higher than its preceding neighbor by one-seventh of the distance between teeth on the rack E. The number of pawls and the closeness of the teeth on the rack E is sufficient to cause some one of the pawls to engage the rack practically at all times, whereby there is no appreciable lost motion between the downward movement of the pawl end of the lever and the block which carries the rack. A spring $f^{26}$ drawing downward on the outer end of the lever $f$ retains all the parts against one side of their bearings to prevent lost motion. In a T-slot $f^5$ in the rear side of the lever $f$ is a closely-fitting block $f^6$, which carries a pin $f^7$, projecting through a horizontal slot $f^8$ in the yoke $f^9$ and engaged by a vertical slot $f^{10}$ in the block $f^{11}$, which extends through an opening $f^{12}$ in the frame A and is rigidly secured to the front side of the plate $c$. This plate $c$, as has been explained, is moved to the right in Figs. 6 and 7 or 9 a distance equal to the aggregate thickness of the temporary spaces in the line, being moved the distance of one tooth on the rack $c^{11}$ for one temporary space. This carries the pin $f^7$ horizontally an amount equal to the aggregate thickness of temporary spaces in the line. Thus when the plate $c$ is at its zero position the center of the pin $f^7$ is in the same vertical plane with the center of the fulcrum $f'$ of the lever $f$. When there is one space in the line, the axis of the pin $f^7$ will be the width of a temporary space distant from the vertical plane passing through the center of the fulcrum $f'$. When there are two, three, four, &c., spaces in the line, the distance between the vertical planes passing through these centers will be equal to two, three, and four, &c., temporary spaces, respectively. Now the yoke $f^9$ is guided between gibs $f^{13}$ $f^{14}$, carried by the plate A, and has near its lower end a stud $f^{15}$, which takes into an inclined slot $f^{16}$ in the guided link $f^{17}$. This link $f^{17}$ yokes around the word-shaft $n$ and carries a roller $f^{18}$, acted upon by the cam-surface $f^{19}$, which for convenience is formed on the periphery of the crown-cam $h^9$, which injects the permanent spaces. Thus as the word-shaft rotates this link is drawn to the left in Fig. 1 by the spring $f^{20}$ and the inclined slot acts upon the stud $f^{15}$ to raise the yoke $f^9$ a definite distance. In the last quarter-rotation of the word-shaft after the insertion of a permanent space into the line the cam-surface $f^{19}$ acts on the link to move it to the right in Fig. 1, thereby lowering the yoke $f^9$. Thus the yoke $f^9$ receives a definite up-and-down movement after the insertion of each permanent space, and the amount of this movement bears such ratio to the length of the lever $f$ that when the pin $f^7$ stands in a position corresponding to one space in the line the pawls will receive a movement equal to the length of one step of the plate $e$. As the pin $f^7$ is shifted for an increasing number of temporary spaces the leverage at which the pawls act will correspondingly decrease, and thus the same movement of the yoke will communicate to the pawls a movement equal to one-half, one-third, one-fourth, one-fifth, &c., of the length of the step as the pin $f^7$ is moved to twice, three times, four times, five times, &c., the one-space distance from the fulcrum of the lever.

When the increasing face of the cam-surface $f^{19}$ passes the roller $f^{18}$, it operates to draw the yoke downward, and the pawls $f^3$ engage the rack $E^2$ of the block E. This block is lowered after the insertion of each space such proportion of a step as unity bears to the total number of spaces in the line, (i. e., the reciprocal of the number of spaces,) wherefore the step engaged by the plunger, as heretofore explained, may pass from engagement with the plunger after the insertion of the required number of the corresponding size of spaces, and thus bring into engagement the next step to cause the remaining spaces in the line to be of the next smaller size.

A spring-actuated pin $E^4$, Figs. 9 and 15, carried in a recess in the guide $E'$ and pressing against a rib $E^5$ of the block E, holds the block with sufficient friction to prevent it from beginning to fall while the plunger is passing from one step to the next, the pressure of the plunger itself normally being sufficient for this purpose. As the plunger is withdrawn from engagement with the block by means of the cam $H^{17}$ during the rotation of the line-shaft, as hereinbefore explained, a lug $H^{20}$, Fig. 9, near the end of the plunger, engages the pin $E^4$, pressing it back against the tension of its spring to permit the block to descend to its zero position in advance of the rising wedge. Another lug $H^{21}$, Figs. 1 and 9, meeting at the same time a bar $f^{21}$, fastened to one of the pawls and projecting across the rest, moves the pawls out of engagement with the racks $E^2$ during the descent and ascent of the block E.

*Return of parts to normal positions.*—As heretofore stated, the justified line is left standing at the mouth of the galley, into which it is delivered at the next succeeding rotation of the line-shaft; but before taking up the description of this, logically the last, operation I will describe the return to their normal positions of those parts which have not been already returned herein. These are the follower-block $b^6$, which the description has left at the end of the justifying-channel, and the space-accounting rack D, which as a matter of fact was returned to its position at the end of the operation of the line-shaft, but which for convenience has not been earlier described. First as to the return of the follower-block $b^6$ to its normal position in the recess $b^7$: A cord $g^{18}$, Figs. 1, 2, 3, and 6, is attached to the follower $b^8$ (lying in a groove $b^{21}$ as the follower is advanced) and runs over a roller $b^{22}$ and has attached to its other end a weight $g^{19}$, which slides on a vertical rod $g^{20}$, the weight being thus lifted as the follower is advanced. The end of a detent $g^{21}$, fulcrumed in the weight, forms a diagonally-downward strut against the rod $g^{20}$, wherefore it does not impede the raising of the weight, but grips the rod sufficiently to prevent the weight from descending. Now as the line is advanced this weight is raised, maintaining itself when the advancing mechanism is inoperative by means of this detent until the type is advanced to the end of the justifying-channel, when the detent is brought into engagement with a stop $g^{23}$ on the rod $g^{20}$, which relatively depresses the inner end of the detent until the spring-actuated plunger $g^{24}$, Fig. 2, engages the recess $g^{25}$ therein and holds the detent out of coöperation with the rod. Thus when the advancing mechanism throws itself out of operation by the justified line coming into its final position the weight has become free and drops by gravity, returning the follower $b^6$ to its initial position in the depression $b^7$, a bevel $b^{23}$ on the upper side of the follower permitting it to pass under the pawl $b$ as it returns. As the weight strikes the bed of the machine at the end of its descent the momentum of the weighted free end of the detent $g^{21}$ causes this detent to be thrown back into engagement with the rod $g^{20}$ ready for the succeeding line.

The last act of the line-shaft just before it ceased its rotation after drawing down the wedge was to release the rack D of the space-accounting mechanism, whereby the latter returned to its initial position ready for use on the succeeding line fed to the machine. This the shaft accomplished by reason of the lug $c^{19}$ on the hub of the cam $c^{12}$, Fig. 3, engaging and elevating the rod $d^7$, Figs. 2 and 6, a projecting pin $d^8$ of which raised the pawls $d^3\ d^4$, whereupon the spring $D^3$ drew the rack back to its initial position.

*Delivery of justified line.*—As heretofore stated, the justified line is left standing at the end of the operation thereon in the justifying-channel opposite the mouth of the receiving-galley P. The operation of the line-shaft starting the justification of the next succeeding line operates to deliver onto the galley this justified line, as will now be explained.

Referring to Figs. 2, 4, and 5, behind the line of type is a horizontal plate $P^2$ of substantially the same cross-section as the justified line, slidable under guides $P^3\ P^3$ and having a movement controlled by the lever $p^2$ taking into an opening in the plate. Fulcrumed at $P^5$ is a lever $P^6$, the end $P^7$ of which is of the width of the galley and stands normally within the mouth of the fixed portion P', (also Fig. 1,) of the galley. The other end P⁸ of this lever overhangs the rear end of the plate P², whereby as the plate is drawn forward (to the left, Fig. 4) and the end P⁸ of the lever P⁶ released the spring P⁹, acting on the lever, will elevate its forward end P⁷. The lever p² is fixed to the shaft p³, carried in bearings p⁴ p⁵, Fig. 2, and having fixed at its other end a lever p⁶, carrying a roller p⁷, acted upon by the crown-cam p on the line-shaft m. Thus when this shaft is again rotated for the succeeding line a decreasing face p¹⁰, Fig. 3, of the cam p permits the spring p⁸ to advance the lever p², and thereby the plate P², to shove the justified line of type in front of it into the galley. As the plate begins to advance its rear end is withdrawn from under the inclined end P⁸ of the lever P⁶, and the spring P⁹ elevating the forward end P⁷ of this lever permits the type to pass beneath it onto the galley above the preceding justified lines therein, which are above the spring-retained block P¹⁰ in the galley. After the line is thus shoved into the galley the inclined end of the lever P⁸ is met by the edge of the plate P² as that plate returns to its normal position under the action of the increasing face of the cam p, whereby the forward end P⁷ of this lever is depressed onto the type in the galley, shoving it downward the body of one line to make room for the next line.

A printer's galley P of the ordinary construction is placed beneath the permanent portion P', and into this the type is shoved as successive lines are justified. The galley is placed at a sufficient angle to prevent the type from falling out and is sustained in position by the block P¹¹ on the inclined frame-plate P¹², provided for the galley-support.

Having described my invention, I claim—

1. In a justifying mechanism, a space-determining mechanism including a series of steps and a connection therefrom for governing the size of space for justification, means for varying said space-determining mechanism according to the shortage of the line to be justified and the number of spaces in that line, and mechanism for thereafter giving periodic variations to the steps relative to the connection therefrom, the amount of which periodic variations is proportionate to the reciprocal of the number of spaces to be justified.

2. In a justifying mechanism, means for placing in the line approximate sizes of spaces to justify it, a space-determining mechanism for governing the size placed and including a series of steps and a connection therefrom, means for giving such space-determining mechanism an initial variation dependent upon the thickness of the individual space theoretically required, means for thereafter giving the space-determining mechanism subsequent periodic variations each proportional to the reciprocal of the number of spaces for justification, whereby the sum of said periodic variations is constant and independent of the number thereof, said periodic variations accumulating to cause the selection of different sizes of spaces at a point dependent upon the said initial variation, substantially as described.

3. In a justifying mechanism, measuring mechanism, a series of steps, a connection between said steps and the spaces to be in the justified line, combined with means for causing movement between said steps and said connection according to the measuring mechanism, and means for causing periodic movements thereof each of which is a fraction of a step equal to the reciprocal of the number of spaces to be justified.

4. In a justifying mechanism, space-controlling mechanism comprising a series of steps and a connection therefrom combined with means for causing periodic movements between such steps and connection, each of which movements is a fraction of a step equal to the reciprocal of the number of spaces to be justified.

5. In a justifying mechanism, measuring mechanism which has a movement according to the size of individual space required to equally space a given line, a series of steps, and a connection between said steps and the spaces to be in a justified line, combined with means for causing initial movement between the steps and said connection according to the measuring mechanism, and means for causing a periodic movement thereof which is a fraction of a step equal to the reciprocal of the number of spaces to be justified, substantially as described.

6. In a justifying mechanism, in combination, a case containing permanent spaces graded in respect to thickness, a justifying-channel adapted to contain a line of type, means for shifting the case relative to the channel to cause different-sized spaces to coöperate therewith, means for forcing a space from the space-case into the justifying-channel, means for varying the mechanism which determines the position of said case periodically during the justification for each space inserted an amount which is such fraction of the maximum amount required to shift the case from one permanent space to the next as is expressed by the reciprocal of the number of spaces in the line to be justified, substantially as described.

7. In a justifying mechanism, in combination, a type-channel adapted to contain a line of type, a case containing a series of permanent spaces graded in respect to thickness coöperating with said channel, and movable relative thereto, means for forcing a space from said case into the channel, a series of steps, a connection from the steps to the case and determining the position of the case according to the step it engages, and mechanism for changing the relative position of the connection and steps during the justification of the line by periodic movements which are individually of an amount dependent on the number of spaces in the line to be justified, substantially as described.

8. In a justifying mechanism, in combination, a series of steps, a series of spaces graded in respect to thickness, a connection between said spaces and steps whereby the size of space selected is dependent upon that step with which such connection engages, means for placing such selected space in a line being justified, and means for periodically changing the relative position of the steps and said connection during the justification which periodic changes are individually a fraction of the step equal to the reciprocal of the number of spaces to be justified, substantially as described.

9. In a justifying mechanism, in combination, means for holding a line of type and temporary spaces, a series of permanent spaces adapted to replace the temporary spaces, means for causing such replacement, and space-determining mechanism, means whereby its position determines the size of permanent space to be inserted, means for varying said space-determining mechanism periodically during the justification, and means for changing the leverage at which such varying mechanism acts inversely according to the number of temporary spaces in the line, substantially as described.

10. In a justifying mechanism, in combination, means for holding a line of type, a series of spaces graded in respect to thickness adapted to be placed therein, a series of steps, a connection between the steps thereof and such spaces, mechanism for placing the selected space in the line to justify it, mechanism for changing the relative position of the steps and its connection periodically during the justification, means for giving a definite movement to such mechanism and mechanism for changing the leverage at which this last-mentioned means acts inversely according to the number of spaces to be justified, whereby said definite movement produces at the steps a movement proportional to the reciprocal of the number of spaces in the line, substantially as described.

11. In a justifying mechanism, in combination, means for holding a line of type, a plate movable relative thereto, means for moving said plate proportionately to the number of spaces in the line to be justified, a measuring-blade varied in incline by said movement, means for moving the blade thus varied to measure the line, a space-determining mechanism varied to measure the line, a space-determining mechanism varied by the movement of said blade, and a subsequent varying mechanism operated periodically during the justification to change such determining mechanism, means for giving a definite movement to said subsequent mechanism, and a connection between this subsequent mechanism and said plate whereby the leverage is changed inversely according to the number of spaces in the line, substantially as described.

12. In a justifying mechanism, in combination, a series of steps, a series of spaces graded in respect to thickness, a connection between the same and said steps, a varying mechanism adapted to change the relative position of said steps and connection, means for actuating said varying mechanism periodically during the justification, and means for changing the leverage at which such mechanism acts inversely with the number of spaces in the line, whereby each periodic movement may vary the relative position of the steps, and connection proportionately to the reciprocal of the number of spaces to be justified, substantially as described.

13. In a justifying mechanism, in combination, a series of steps, a series of spaces graded in respect to thickness, a connection between said spaces and steps, means for placing a selected space in a line being justified, a lever adapted in its movement to shift said steps, mechanism for operating said lever which is actuated a definite amount for each space placed, and means for varying the leverage at which such operating mechanism acts inversely with the number of spaces to be justified, substantially as described.

14. In a justifying mechanism, means for holding a line of type to be justified, a series of steps, a measuring-blade, means for varying the angle of the blade according to the number of spaces to be justified in the line, means for moving the adjusted blade to measure the line, means for communicating movement from the blade to the steps in relation to a suitable connection leading from said steps, means for varying such relation periodically by an amount which is a fraction of a step equal to the reciprocal of the number of spaces to be justified in the line, combined with such connection, substantially as described.

15. In a justifying mechanism, in combination, means for holding a line of type and temporary spaces, an adjustably-inclined blade, means for changing the angle thereof according to the number of spaces, and the position of the operating end thereof according to the aggregate thickness of the temporary spaces, means for moving said adjusted blade according to the line's shortage, a series of steps moved to a position determined by the position which the blade thus assumes, a lever adapted in its movement to shift said series of steps, an operating mechanism for periodically moving said lever, said operating mechanism being moved a definite amount each time, means for shifting the connection between said operating mechanism and lever away from the pivot of the latter by amounts proportional to the number of spaces in the various lines to be justified, substantially as described.

16. In a justifying mechanism, in combination, a series of steps, a pivoted lever adapted in its movement to move said series, a slidable block carried by said lever, an operating member engaging said block and thus operating the lever with a varying leverage according to the position of the block, means for holding a line of type to be justified, means for taking account of the number of spaces therein, and means for shifting said block accordingly whereby a definite movement of said operating member communicates to the series of steps a movement proportional to the reciprocal of the number of spaces in the line, and a suitable connection leading from the steps and the spaces to be in a justified line, substantially as described.

17. In a justifying mechanism, in combination, a justifying-channel adapted to contain a line of type, a case adapted to contain a series of spaces graded in respect to thickness coöperating with said channel, a series of steps, a connection between the space-case and steps whereby the size of space to be inserted is dependent upon the step with which said connection engages, means for giving initial movement to the steps relative to such connection according to the individual size of space required to justify the line and independent of the number of such spaces, and means for thereafter during justification giving a periodic relative movement between said parts which is a fraction of a step equal to the reciprocal of the number of spaces in the line to be justified, substantially as described.

18. In a justifying mechanism, in combination, a selecting member carrying a series of steps and a series of teeth, a lever carrying a series of verniered pawls adapted to engage said teeth, an operating member for actuating said lever, means for varying the connection between said operating member and the lever whereby the leverage is changed inversely with the number of spaces in the line to be justified, means for periodically moving said operating member during justification and a suitable connection from said steps whereby the relative position of the selecting member thereto determines the size of space to be in the justified line, substantially as described.

19. In a justifying mechanism, in combination, a series of steps, a connection leading from the steps thereof to permanent spaces to be in the justified line, a lever adapted in its movement to vary the relative position of the connection and steps, an operating member for actuating said lever, means for varying the connection between said operating member and the lever whereby the leverage is changed inversely with the number of spaces in the line to be justified, means for periodically moving said operating member during justification, and a suitable connection from said steps whereby the relative position thereof determines the size of space to be in the justified line, substantially as described.

20. In a justifying mechanism, in combination, a selecting mechanism having a series of steps and a series of teeth rigid therewith, a pawl adapted to engage said teeth, means for actuating said pawl, and means for varying the actuation of the pawl inversely with the number of spaces in the line to be justified.

21. In a justifying mechanism, in combination, a selecting mechanism having a series of steps and a series of teeth rigid therewith, a movable member, a series of verniered pawls carried by said member and adapted to engage said teeth, and means for moving said member.

22. In a justifying mechanism, in combination, a space-determining mechanism including a series of steps, means for initially placing said steps according to the line shortage and the number of spaces to be justified, and means for subsequently varying the position of the steps according to the number of spaces in the line.

In testimony whereof I hereunto affix my signature in the presence of two witnesses.

FRANCIS B. CONVERSE, Jr.

Witnesses:
F. D. AMMEN,
E. B. GILCHRIST.